US009494235B2

United States Patent
Winslow et al.

(10) Patent No.: US 9,494,235 B2
(45) Date of Patent: Nov. 15, 2016

(54) HOLLOW, ELASTIC EXPANSION-JOINT SEAL

(71) Applicant: InPro Corporation, Muskego, WI (US)

(72) Inventors: John A. Winslow, Snellville, GA (US); G. Matthew Fisher, Wauwatosa, WI (US); David R. Gebhardt, Shorewood, WI (US)

(73) Assignee: InPro Corporation, Muskego, WI (US)

( * ) Notice: Subject to any disclaimer, the term of this patent is extended or adjusted under 35 U.S.C. 154(b) by 0 days.

(21) Appl. No.: 13/960,193

(22) Filed: Aug. 6, 2013

(65) Prior Publication Data

US 2015/0042047 A1 Feb. 12, 2015

(51) Int. Cl.
*F16J 15/02* (2006.01)
*B29D 99/00* (2010.01)
*E04B 1/68* (2006.01)

(52) U.S. Cl.
CPC .......... *F16J 15/022* (2013.01); *B29D 99/0053* (2013.01); *E04B 1/6813* (2013.01)

(58) Field of Classification Search
CPC ................... F16J 15/0887; F16J 15/064; F16J 15/02; F16J 15/061; F16J 15/062; F16J 15/022; B29D 99/0053; E04B 1/68
USPC ....... 277/628, 630, 631, 637, 640, 641, 644, 277/643, 648, 650, 645, 906, 921; 52/396.03, 396.06
See application file for complete search history.

(56) References Cited

U.S. PATENT DOCUMENTS

| | | | | |
|---|---|---|---|---|
| 3,358,568 A | * | 12/1967 | Brown | E01C 11/106 404/65 |
| 3,608,442 A | * | 9/1971 | Berchou et al. | 404/65 |
| 3,682,053 A | * | 8/1972 | Kerschner | E01C 11/02 404/65 |
| 3,765,784 A | * | 10/1973 | Watson et al. | 404/64 |
| 3,776,654 A | | 12/1973 | Brown | |
| 3,918,824 A | | 11/1975 | Bowman | |
| D247,185 S | | 2/1978 | Puccio | |
| D247,373 S | | 2/1978 | Puccio | |
| D247,374 S | | 2/1978 | Puccio | |
| 4,098,043 A | | 7/1978 | McCready | |
| 4,148,167 A | * | 4/1979 | Puccio | 52/396.06 |
| D261,045 S | | 9/1981 | Bowman | |

(Continued)

OTHER PUBLICATIONS

U.S. Appl. No. 29/462,600, filed Aug. 6, 2013, InPro Corporation.

(Continued)

*Primary Examiner* — Kristina Fulton
*Assistant Examiner* — Nathan Cumar
(74) *Attorney, Agent, or Firm* — Reinhart Boerner Van Deuren s.c.

(57) ABSTRACT

An elastic seal for a building joint which includes internal walls or dividers which change orientation when the seal is compressed for placement into the building joint. The change in orientation allow for the seal to apply a relatively uniform force against the joint walls extending from the bottom wall to the top wall of the seal. Additionally, the change in orientation reduces the deflection of the top wall of the seal upwardly when compressed in the building joint. The walls also become more vertically oriented when the seal in compressed. This vertical orientation provides increased load support for the top wall when the seal is compressed into a joint.

22 Claims, 17 Drawing Sheets

(56) References Cited

U.S. PATENT DOCUMENTS

| | | |
|---|---|---|
| D261,046 S | 9/1981 | Bowman |
| D265,687 S | 8/1982 | Bowman |
| 4,351,622 A | 9/1982 | Kerschner |
| 4,362,428 A * | 12/1982 | Kerschner ............ E01C 11/106 404/64 |
| 4,708,517 A | 11/1987 | Nicholas et al. |
| 4,743,036 A | 5/1988 | Nicholas |
| 4,799,345 A | 1/1989 | Rizza |
| D328,784 S | 8/1992 | Ragonesi |
| 5,365,713 A * | 11/1994 | Nicholas ................ E04B 1/681 52/396.03 |
| 5,575,126 A | 11/1996 | Attaway et al. |
| D547,465 S | 7/2007 | Mann |
| D628,719 S | 12/2010 | Wagner |
| 8,132,380 B2 | 3/2012 | Wilkes, Jr. |
| 8,317,444 B1 | 11/2012 | Hensley |
| 8,341,908 B1 | 1/2013 | Hensley et al. |
| 8,365,495 B1 | 2/2013 | Witherspoon |
| 8,739,495 B1 | 6/2014 | Witherspoon |
| 8,813,449 B1 | 8/2014 | Hensley et al. |
| 8,813,450 B1 | 8/2014 | Hensley et al. |
| D739,564 S | 9/2015 | Winslow et al. |
| 2007/0256380 A1 | 11/2007 | Toffolo |
| 2008/0315531 A1 * | 12/2008 | Hrovath ........................ 277/628 |
| 2010/0058696 A1 | 3/2010 | Mills |

OTHER PUBLICATIONS

InPro Corporation, AR Series Seal Expansion Joint Systems website at https://www.inprocorp.com/Default.aspx?TabId=57&ProductID=145&SEName=ar-series-seal&&145, showing an image of a compression seal believed to be available at least one year before Aug. 6, 2013, 3 pages.

InPro Corporation, BR Series Seal Expansion Joint Systems website at https://www.inprocorp.com/store/product/tabid/57/p-146-br-series-seal.aspx, showing an image of a compression seal believed to be available at least one year before Aug. 6, 2013, 3 pages.

D.S. Brown, Architectural Products Datasheet for Delpatch™ WAF Systems, available at http://www.dsbrown.com/Resources/Architectural/DelpWAFdata.pdf, dated Aug. 2012, 1 page.

Doshin Rubber Products (M) SDS BHD, Doshin Compression Seal Joints showing the installation for the V series seal joint, available at http://www.doshinrubber.com/catalog/images/Doshin-Compression-Seal-Joint.pdf, believed to be available at least one year before Aug. 6, 2013, 2 pages.

* cited by examiner

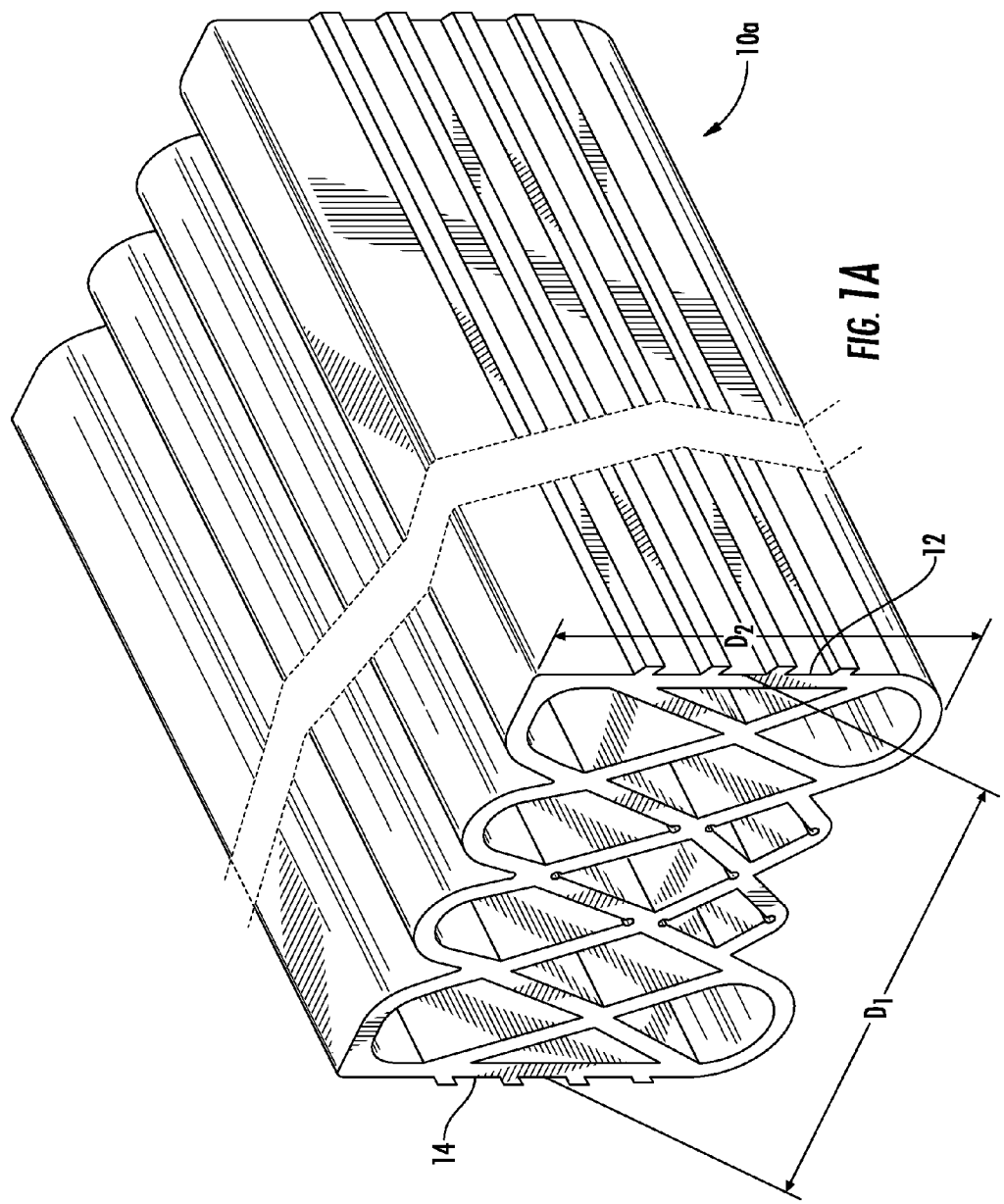

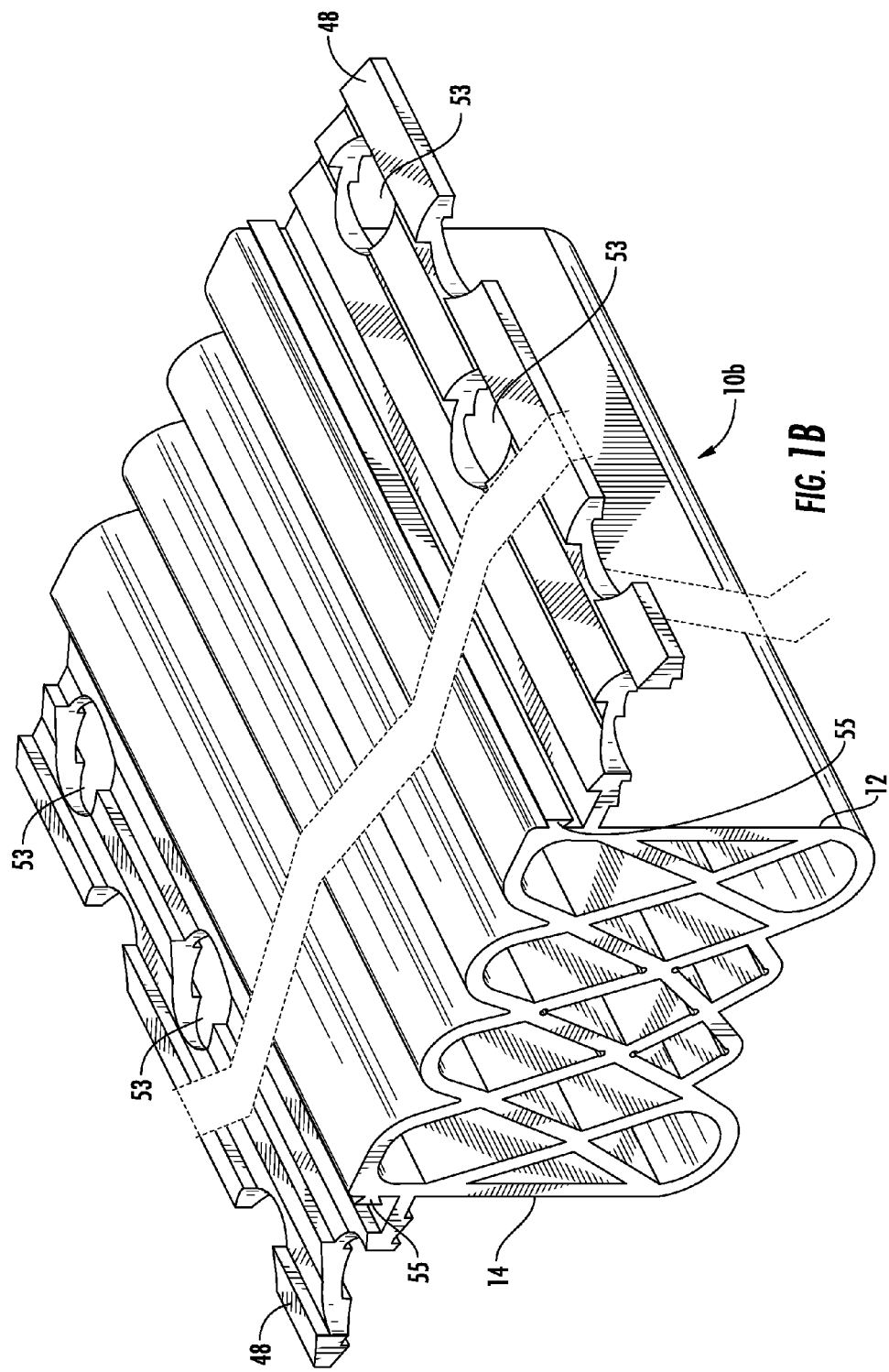

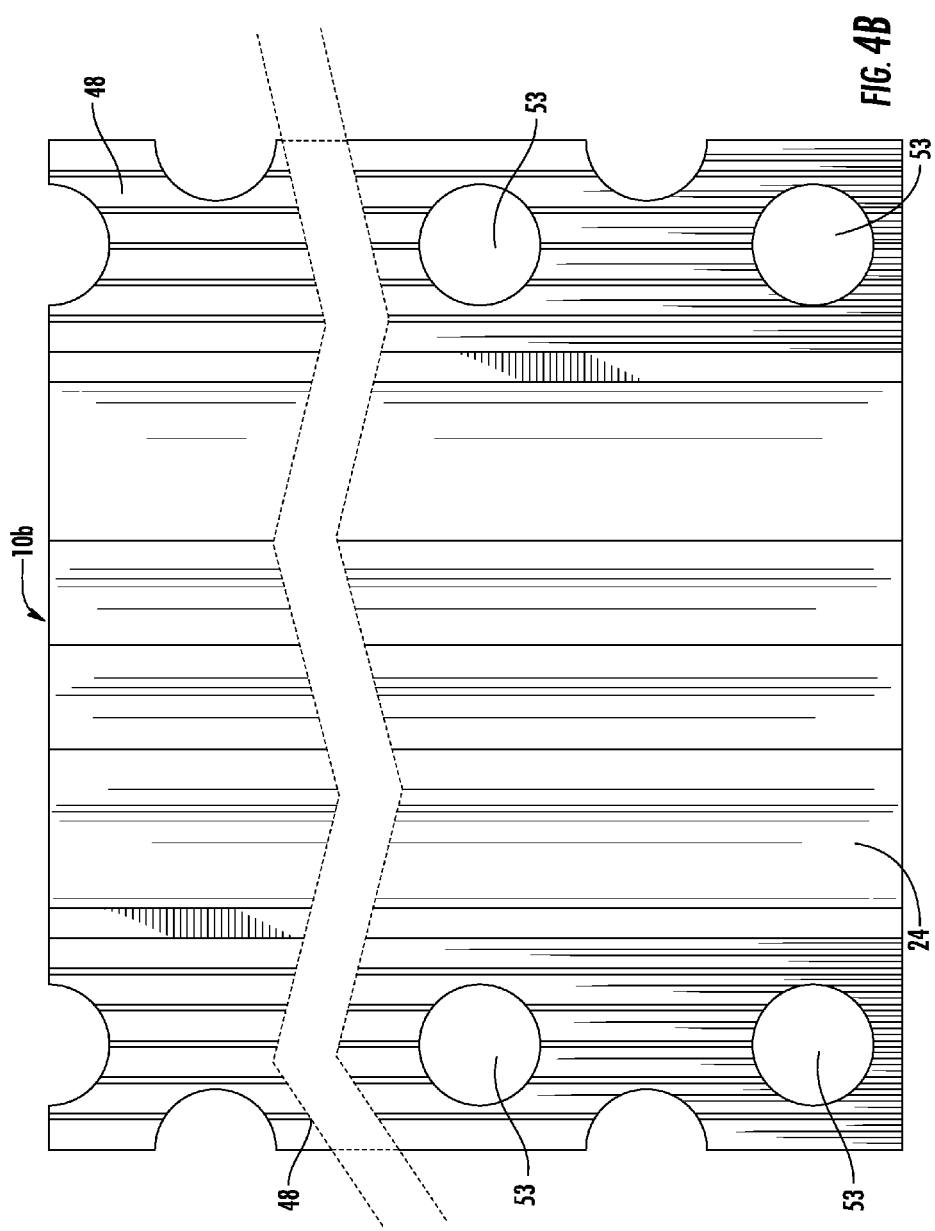

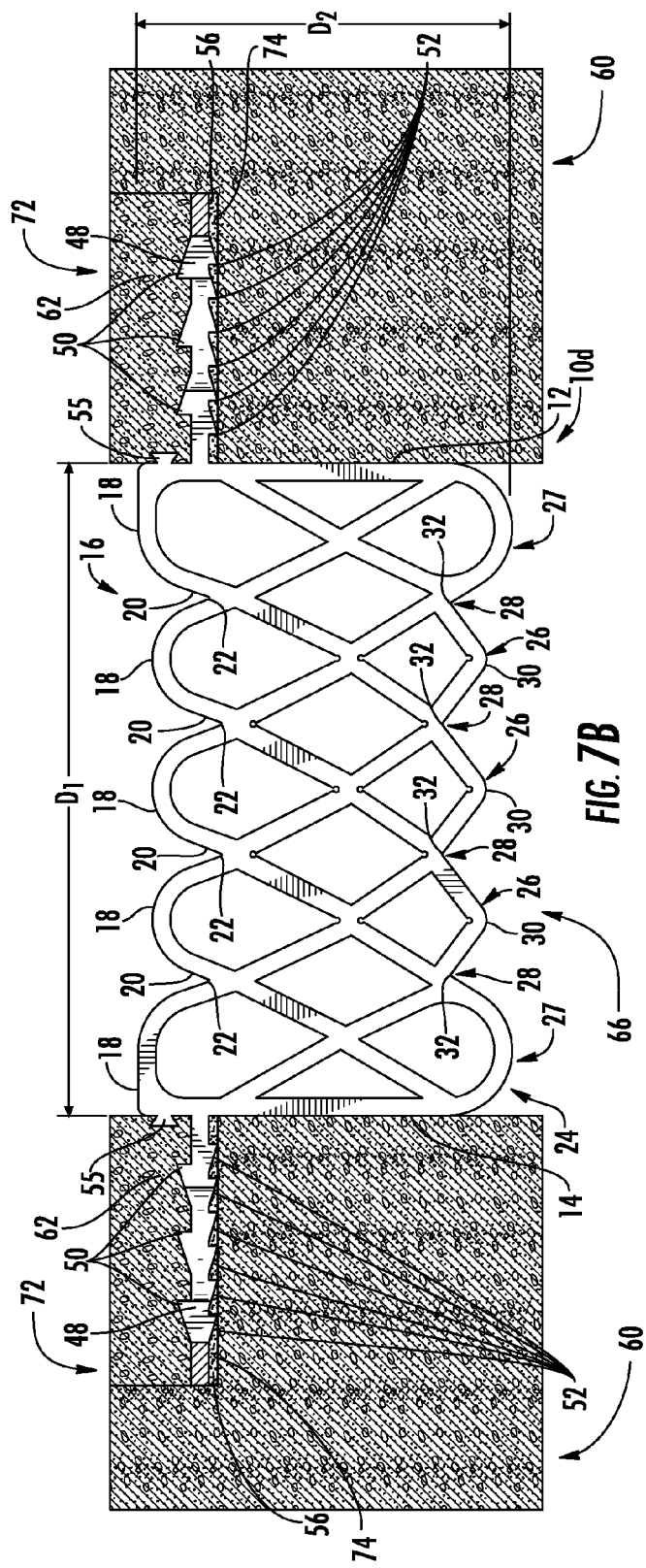

HOLLOW, ELASTIC EXPANSION-JOINT SEAL

BACKGROUND OF THE INVENTION

The present invention relates to bridging or sealing gaps in building structures. These gaps or joints are typically provided to permit expansion and contractions of building components such as walls, floors, ceilings and roofs. In particular, the present invention relates to a hollow, elongated, elastic joint seal or filler which is compressed when located in such gaps with the hollow portions of the seal being defined by an arrangement of interior wall/dividers which interact to change the structural characteristics of the seal after compression.

SUMMARY OF THE INVENTION

One embodiment relates to an elastic seal usable in an expansion joint of a building. The seal includes a pair of substantially parallel side walls, a top wall extending between the side walls and a bottom wall extending between the side walls. The side walls include longitudinal axes at least 24 inches long, with the walls separated by a first distance. The top wall includes a cross-sectional shape with at least 2 crests and at least 3 troughs. The bottom wall is displaced from the top wall such that the cross-section of the walls of the seal includes points which lay upon a boundary of a rectangle and the bottom wall includes a cross-sectional shape with at least 2 crests and at least 3 troughs. The seal also includes at least 2 webs that include an elongated, rectangular cross-section located within the boundary of the rectangle, each web includes a longitudinal axis parallel with the longitudinal axis of the side walls and each web extending from a side wall to a trough in the top or bottom walls. The angle between webs and the respective side walls is at least 30 degrees when the walls are separated by the first distance, and the angle is reduced to less than 25 degrees when the seal is compressed so that the distance is reduced by 35%. The seal also includes at least 2 webs that include an elongated, rectangular cross-section located within the boundary of the rectangle, each web includes a longitudinal axis parallel with the longitudinal axis of the side walls and each web extending from a trough in the top wall to a trough in the bottom wall. The angle between webs is at least 50 degrees when the walls are separated by the first distance, and the angle is reduced to less than 30 degrees when the seal is compressed so that the distance is reduced by 35%.

Another embodiment relates to an elastic seal usable in an expansion joint of a building. The seal includes a pair of substantially parallel side walls, a top wall extending between the side walls and a bottom wall extending between the side walls. The side walls include longitudinal axes at least 24 inches long, with the walls separated by a first distance. The bottom wall is displaced from the top wall such that the cross-section of the walls of the seal includes points which lay upon a boundary of a rectangle. The seal also includes at least 2 webs that include an elongated, rectangular cross-section located within the boundary of the rectangle, each web includes a longitudinal axis parallel with the longitudinal axis of the side walls and each web extending from a side wall to one of the top or bottom walls. The angle between webs and the respective side walls is at least 30 degrees when the walls are separated by the first distance, and the angle is reduced to less than 25 degrees when the seal is compressed so that the distance is reduced by 35%. The seal also includes at least 2 webs that include an elongated, rectangular cross-section located within the boundary of the rectangle, each web includes a longitudinal axis parallel with the longitudinal axis of the side walls and each web extending from the top wall to the bottom wall. The angle between webs is at least 50 degrees when the walls are separated by a first distance, and the angle is reduced to less than 30 degrees when the seal is compressed so that the distance is reduced by 35%.

Yet another embodiment relates to an elastic seal useable in an expansion joint of a building. The seal includes a pair of substantially parallel side walls, a top wall extending between the side walls and a bottom wall extending between the side walls. The side walls include longitudinal axes at least 24 inches long, with the walls separated by a first distance. The bottom wall is displaced from the top wall such that the cross-section of the walls of the seal includes points which lay upon a boundary of a rectangle. The seal also includes a plurality of webs each including an elongated, rectangular cross-section located within the boundary of the rectangle, each web includes a longitudinal axis parallel with the longitudinal axis of the side walls and each web extending from a side wall to one of the top or bottom walls. The seal also includes a plurality of webs that include an elongated, rectangular cross-section located within the boundary of the rectangle, each web includes a longitudinal axis parallel with the longitudinal axis of the side walls and each web extending from the top wall to the bottom wall. The force to compress the top wall between the side walls a predetermined distance is substantially the same force required to compress the bottom wall between the side walls substantially the predetermined distance.

Yet another embodiment relates to a method of manufacturing an elastic seal useable in an expansion joint of a building. The method includes extruding an elastic material through a die configured to produce a seal and cutting the extruded in a direction substantially perpendicular to the longitudinal axes of the side walls. The seal includes a pair of substantially parallel side walls, a top wall extending between the side walls and a bottom wall extending between the side walls. The side walls include longitudinal axes at least 24 inches long, with the walls separated by a first distance. The top wall includes a cross-sectional shape with at least 2 crests and at least 3 troughs. The bottom wall is displaced from the top wall such that the cross-section of the walls of the seal includes points which lay upon a boundary of a rectangle. The bottom wall includes a cross-sectional shape with at least 2 crests and at least 3 troughs. The seal also includes at least 2 webs that include an elongated, rectangular cross-section located within the boundary of the rectangle, each web includes a longitudinal axis parallel with the longitudinal axis of the side walls and each web extending from a side wall to a trough in the top or bottom walls. The angle between webs and the respective side walls is at least 30 degrees. The seal also includes at least 2 webs that include an elongated, rectangular cross-section located within the boundary of the rectangle, each web includes a longitudinal axis parallel with the longitudinal axis of the side walls and each web extending from a trough in the top wall to a trough in the bottom wall. The angle between webs is at least 50 degrees.

BRIEF DESCRIPTION OF THE FIGURES

This application will become more fully understood from the following detailed description, taken in conjunction with the accompanying figures, wherein like reference numerals refer to like elements in which:

FIGS. 1A and 1B are perspective views of 2 embodiments of the seal;

FIGS. 4A and 4B are bottom views of the 2 embodiments of the seal;

FIGS. 7A and 7B are end views of 2 additional embodiments of the seal which include additional internal walls/dividers.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 2A:
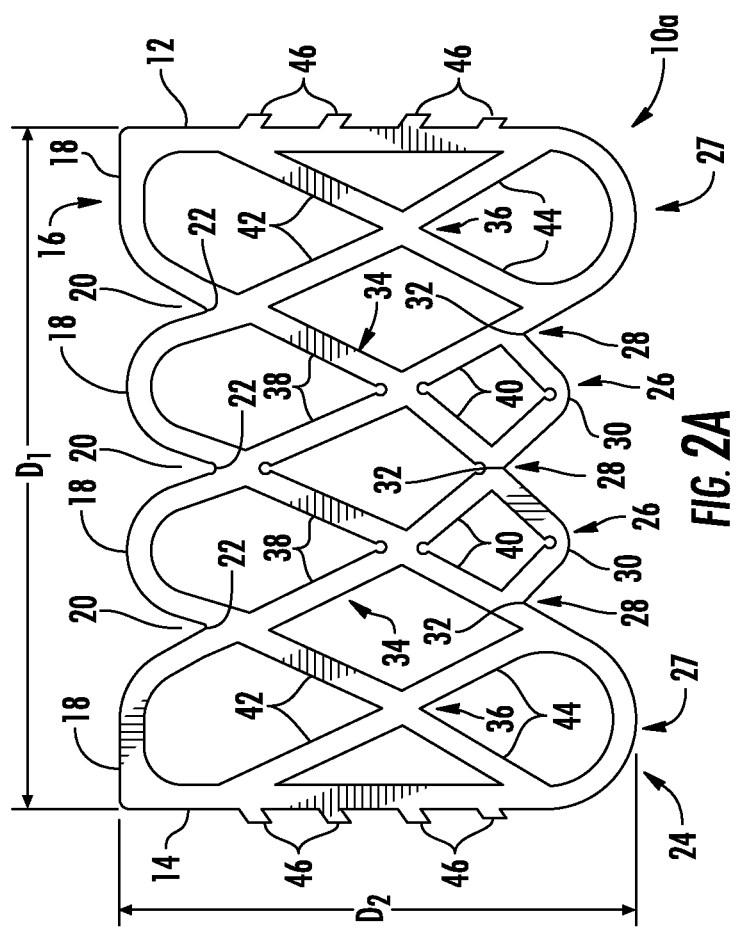
FIGS. 2A and 2B are end views of the 2 embodiments of the seal.
Figure 2B:
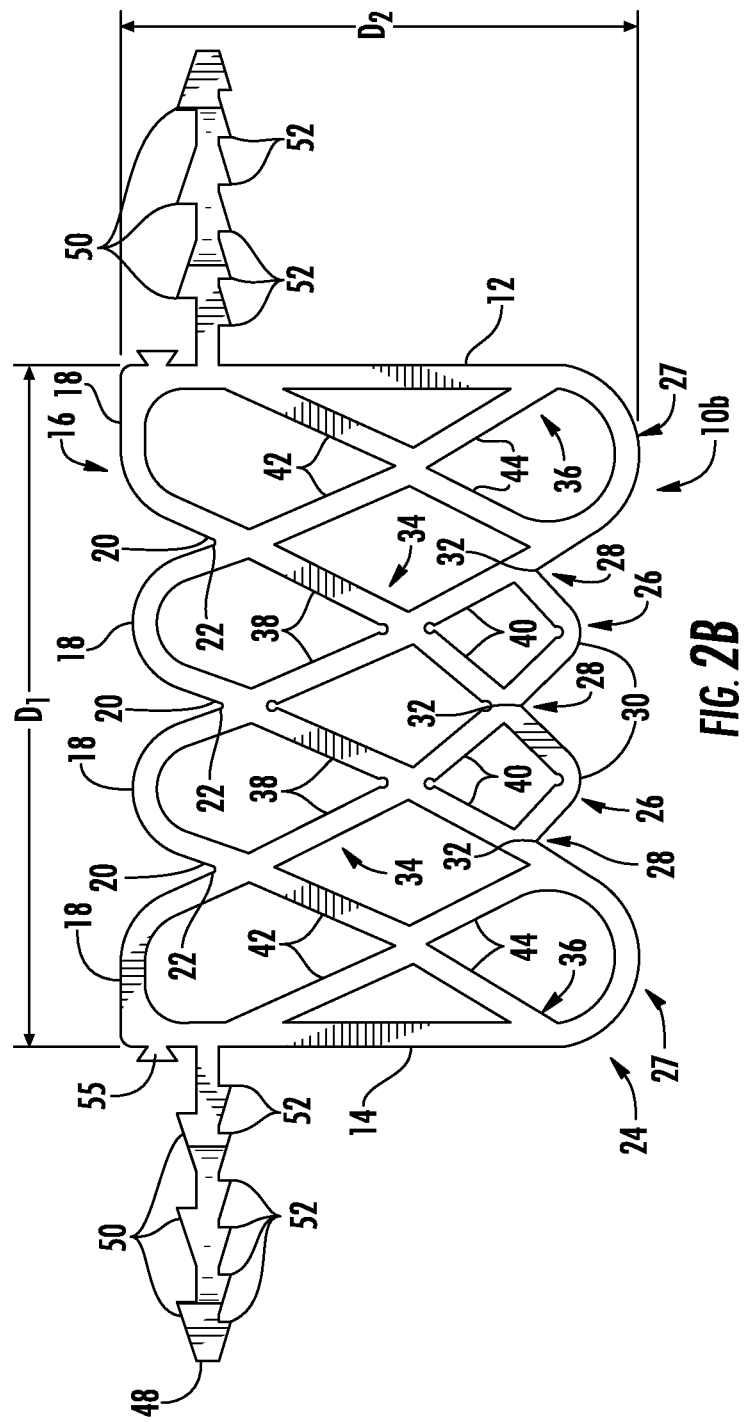
Figure 3A:
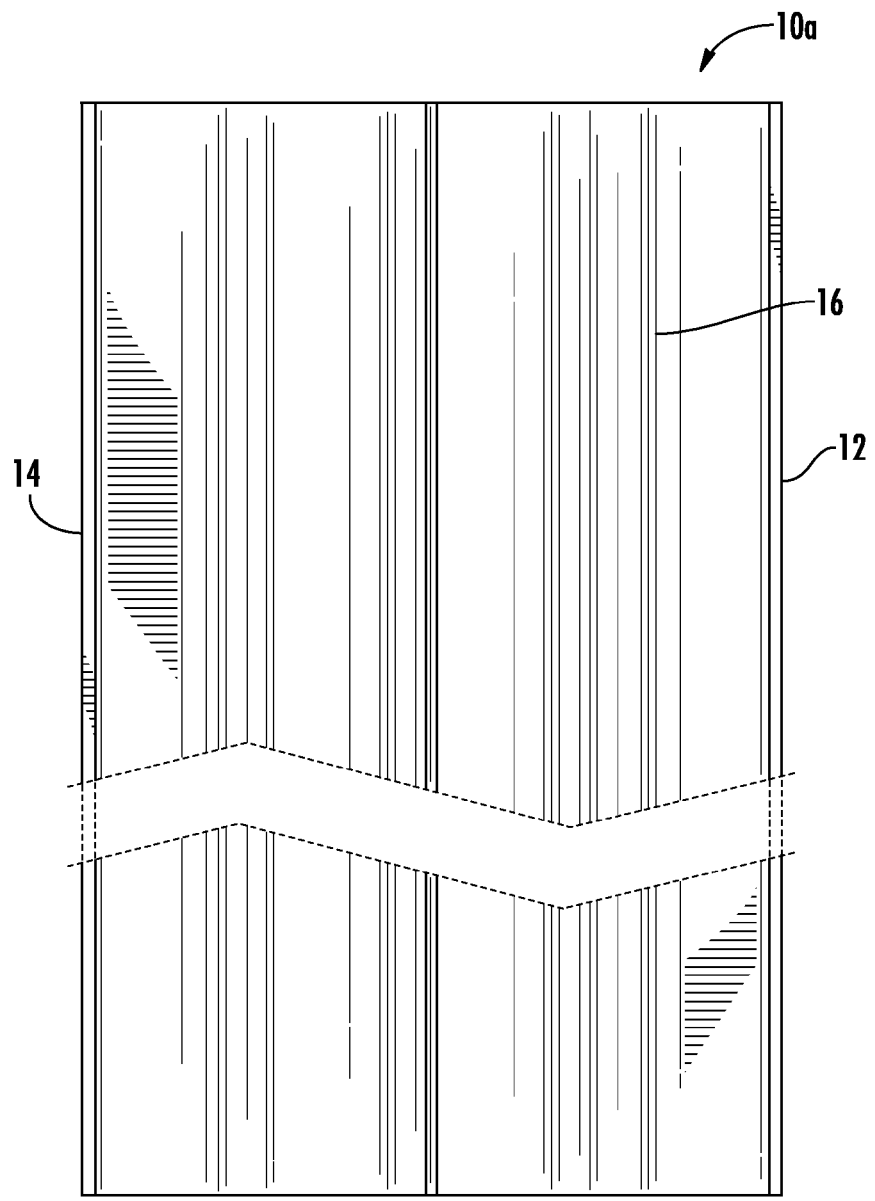
FIGS. 3A and 3B are top views of the 2 embodiments of the seal.
Figure 3B:
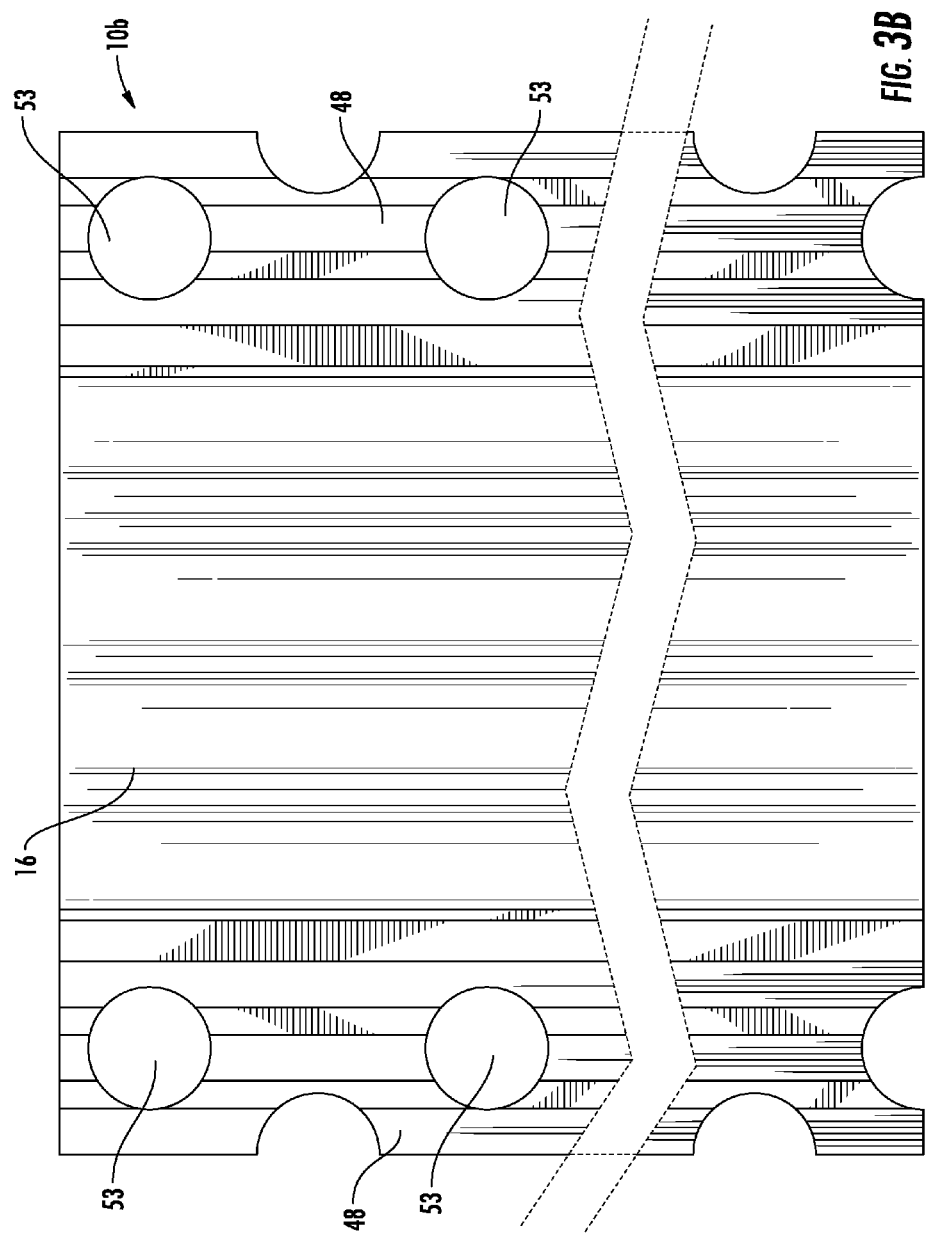
Figure 4A:
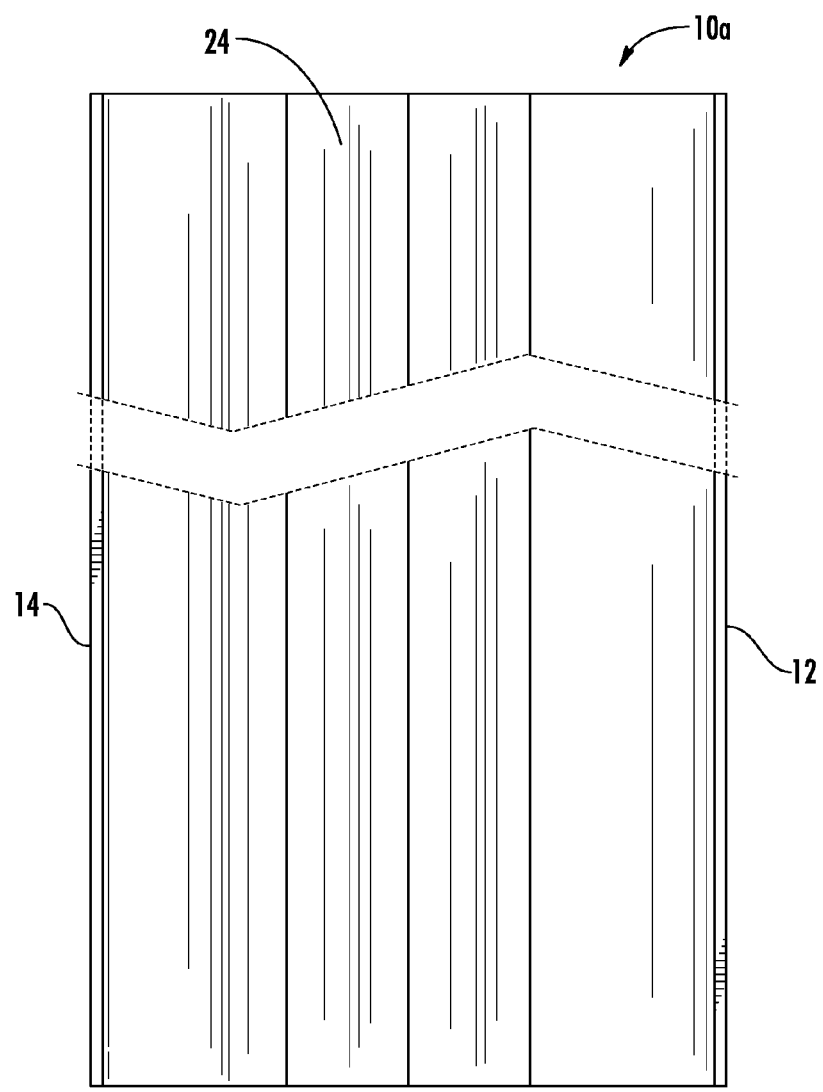
Figure 5A:
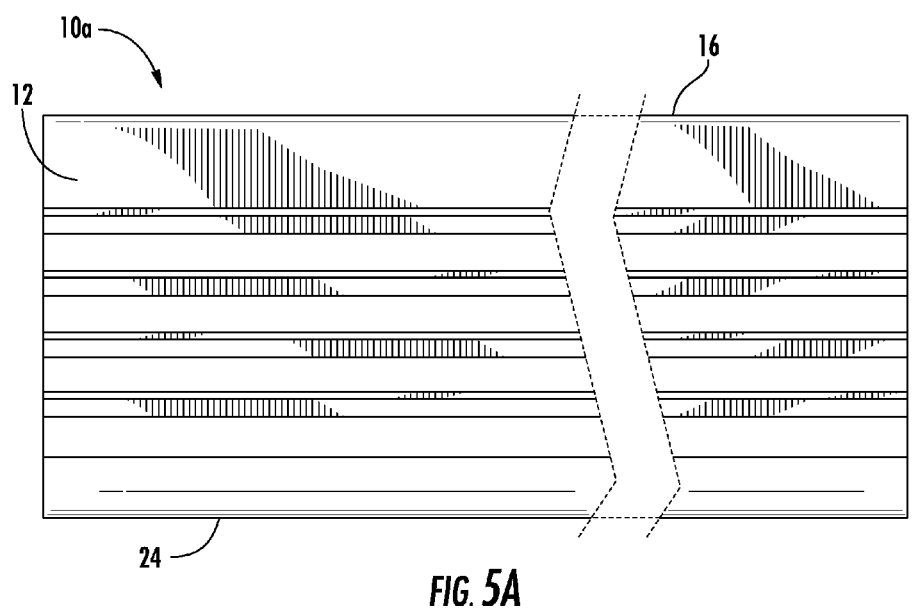
FIGS. 5A and 5B are side views of the 2 embodiments of the seal.
Figure 5B:
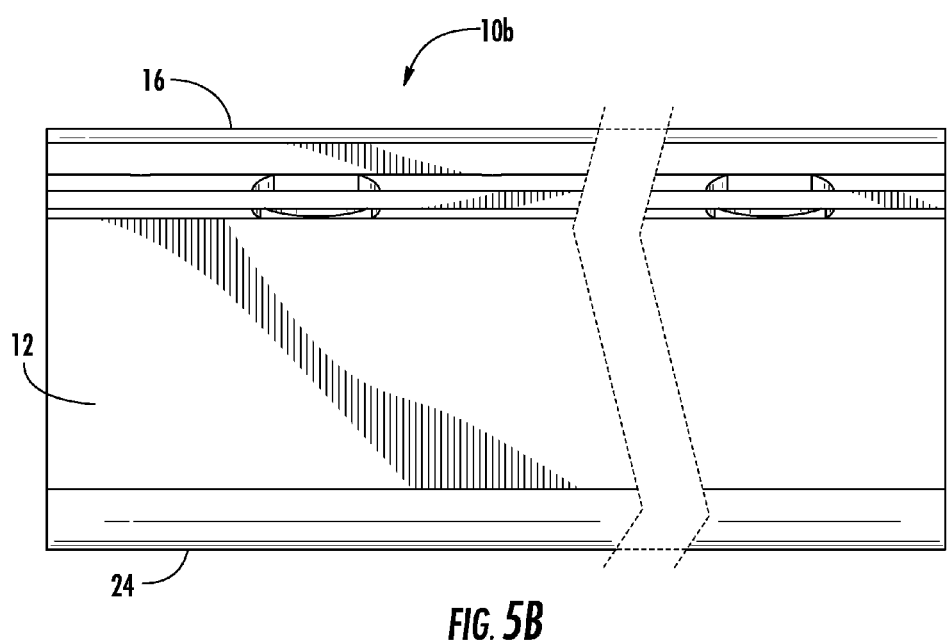

Referring to FIGS. 1A and 2A, the seal 10a (first embodiment) and 10b (second embodiment) is elongated and has a substantially constant cross-section along its length. The cross-section is substantially constant in that the seal is preferably manufactured by extruding the material which from the seal is formed from a die which produces the desired cross-section. (See, e.g. FIGS. 2A, 2B, 7A, and 7B.) The extrusion may be in the form of continuous extrusion which permits the generation of long sections of the seal which can be later cut into custom lengths ordered by customers, or stock lengths which normally start at 60 feet.

By way of example, the seal may be fabricated from a thermoplastic elastic material. The use of a thermoplastic material permits the thermal welding of sections or pieces of the seal to each other. Sections or pieces can also be glued to each other if thermal welding equipment and filler is not available. If a thermoset elastic material is used, such thermal welding is typically not used. Rather, sections or seal pieces must be appropriately glued to each other. Accordingly, the use of a thermoplastic elastic material provides flexible and compressible seals which can be joined to each other via at least 2 processes, e.g. thermal welding and gluing. By way of example, the seal can be extruded from a thermoplastic elastomer such as a thermoplastic vulcanizate elastomer which is available under the trademark, Santoprene from Exxon Mobil. It is to be noted for the reader that the use of the word "seal" references the filling of an expansion joint and applies to a seal which may or may not form a fluid tight seal. Such a seal may be only a barrier to the passing of relatively large debris through the joint (e.g. gravel, sand, car keys, feet, shoe heels, etc.)

Referring to FIGS. 2A, 2B, 6A, 6B, 7A, and 7B, seals 10a, 10b, 10c and 10d include substantially parallel side walls 12, 14 having longitudinal axes which are separated by a distance $D_1$ which defines the width of the seal which is selected based upon the width of the particular expansion joints 66 within which the seals are to be used. By way of example, for typical applications, $D_1$ may be in the range of 70 mm to 160 mm, with particular applications using $D_1$s of about 74 mm, 110 mm, and 146 mm.

The side walls 12, 14 include generally elongated rectangular cross-sections. The seals include top walls 16 which extend between the side walls 12, 14. The top walls 16 include rounded crests 18, and v-shaped troughs 20 which terminate at a rounded tip 22 having an interior radius substantially smaller than the interior radius of the rounded crest 18. For example, the radii of the crests 18 may be in the range of 5 to 10 times larger than those of the tips 22, and in one embodiment between 7.5 and 8.5 times larger. Top walls 16 of seal embodiments 10a and 10b include 4 crests 18 and 3 troughs 20, and top walls 16 of seal embodiments 10c and 10d include 5 crests 18 and 4 troughs 20. Of course, the number of crests and troughs provided in the seal would be selected based upon the width and type of expansion joint 66 being sealed.

The seals also include bottom walls 24 separated from top walls 16 by a distance $D_2$. By way of example, for typical applications, $D_2$ may be in the range of 50 mm to 90 mm, with particular applications using $D_2$s of about 56 mm and 84 mm.

Walls 24 include interior v-shaped crests 26, exterior rounded crests 27 and v-shaped troughs 28. Crests 26 and troughs 28 terminate at tips 30 and 32, respectively, which are rounded and have similar inside radii. These radii are substantially smaller than the radii of the rounded crests 27. For example, the radii of the crests 27 may be in the range of 5 to 10 times larger than the radii of tips 30 and 32, and, in one embodiment, between 7.5 and 8.5 times larger. Bottom walls 24 of seal embodiments 10a and 10b include 2 crests 26, 2 crests 27 and 3 troughs 28, and the bottom walls 24 of seal embodiments 10c and 10d include 3 crests 26, 2 crests 27 and 4 troughs 28. Of course, the number of crests and troughs provided in the bottom wall of the seal would correspond with the number in the top wall.

Referring now to the interior of the seal and, in particular to FIGS. 2A, 2B, 7A, and 7B, this interior includes a plurality of walls or dividers 34, 36 which each include a pair of elongated rectangular segments 38, 40 and 42, 44, respectively. Walls 34 extend between the troughs 20 and 28, and walls 36 extend between the respective sidewall 12,14 and respective outside trough 20, 28 as shown. In the present embodiments, segments 38 and 40, and 42 and 44 are connected to have a slight mis-alignment. However, depending upon the deflection characteristics desired from the seal or the particular material used, these segments may be connected together so that they are aligned such that the transitions from one segment to another of the dividers 34 and 36 are not noticeable.

In the uncompressed condition, the side walls of dividers 34 are positioned at an angle $\theta_1$ of about 50 to 60 degrees with side walls 12, 14. Dividers 36 are positioned at an angle $\theta_2$ of about 25 to 35 degrees with side walls 12, 14. As discussed above, the number of crests and troughs may vary depending upon the width and type of the expansion joint 66. Accordingly, if the width $D_1$ increases, the number of crests and troughs would need to increase to maintain the angles discussed above within the ranges discussed above.

Referring again to the 4 seal embodiments, 2 of the embodiments include side ribs 46 configured as shown to aid in securing the respective seal within a building joint. The shown embodiment of the ribs 46 extend from an angle of about 50 degrees from the side walls 12, 14 and terminates at a flat end with a surface parallel to the respective side walls 12, 14. Seal embodiments 10b and 10d include extension flanges 48 which extend from side walls 12, 14, and include relatively large ribs 50 on the top surface and smaller ribs 52 on the bottom surface which have a triangular shape as shown. Flanges 48 also include holes 53. In addition to flanges 48, seal embodiments 10b and 10d also include a trapezoidal shaped ribs 55 located just above extension flanges 48 as shown in the figures.

Figure 6A:
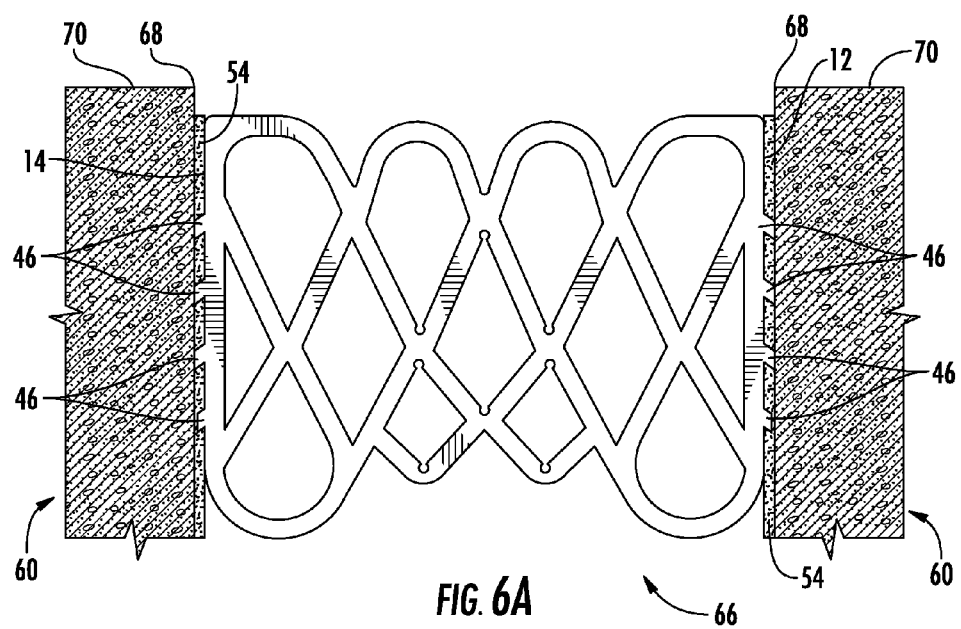
FIGS. 6A and 6B are end views of the 2 embodiments of the seal in combination with the joint of a building structure such as a floor, the seal being compressed and glued into the joint.
Figure 6B:
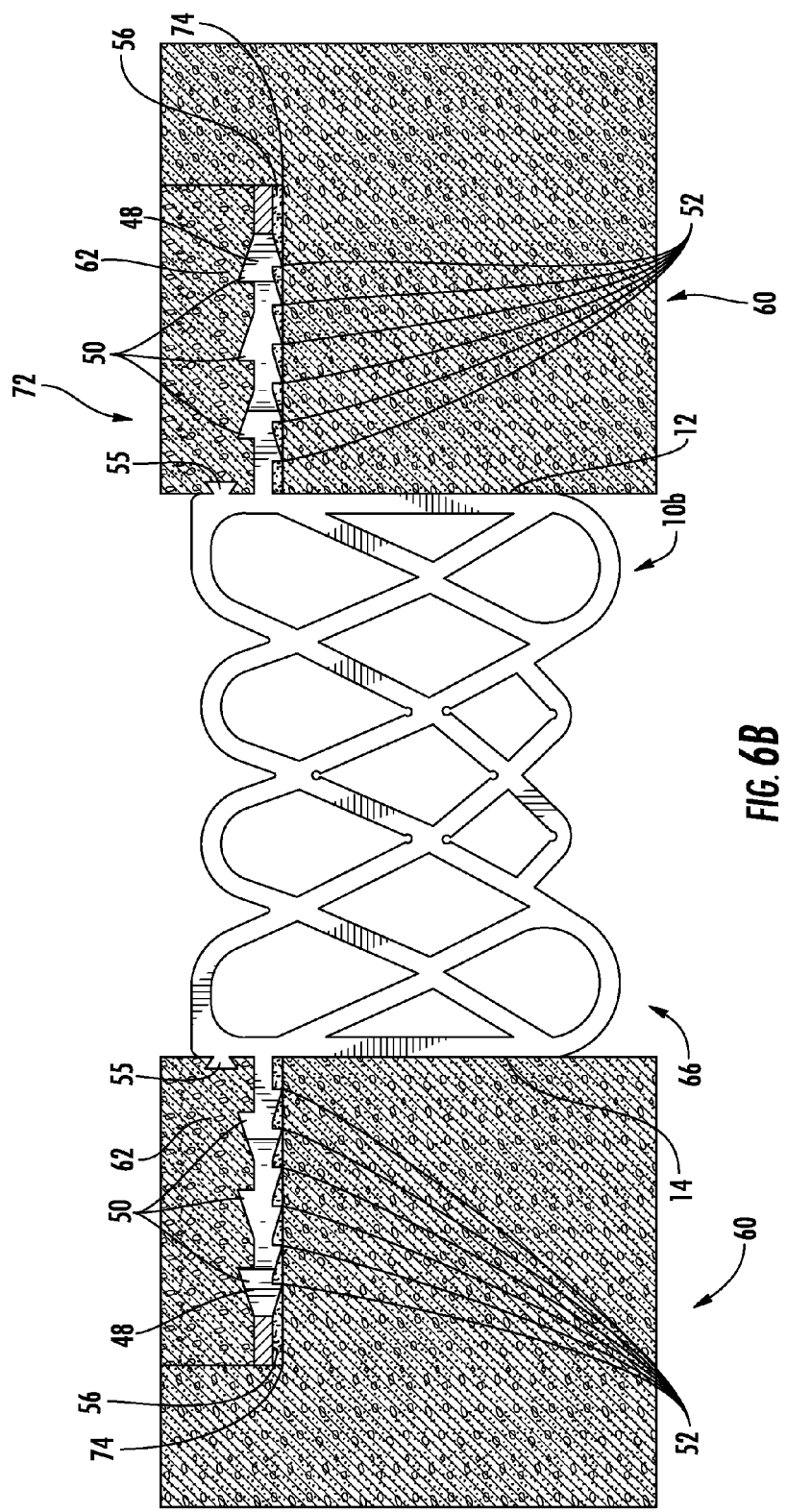
Figure 7A:
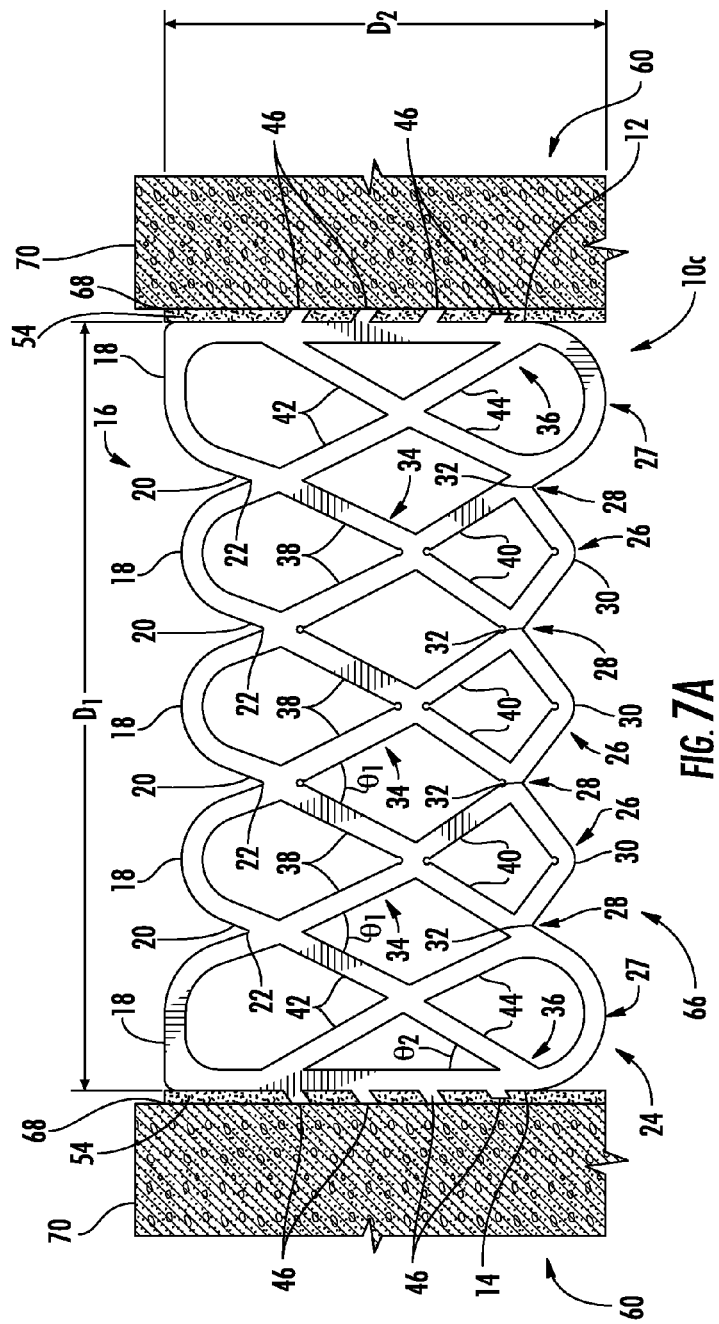

Referring to FIGS. 6A, 6B, 7A and 7B, these illustrate the interaction between the seals and a building joint 60 in a concrete floor. In FIGS. 6A and 7A, the building joint 60 includes a joint surface 68 a top joint edge 70. In FIGS. 6A and 7A, the seal is fastened within the expansion joint 66 by the interaction of walls 12, 14, side ribs 46, an adhesive 54, such as epoxy, and the corresponding joint surfaces 68. In FIGS. 6B and 7B, the building joint 60 includes a blockout area 72. The blockout area 72 further includes a blockout top surface 74. In FIGS. 6B and 7B, the seal is fastened within the expansion joint 66 by the interaction of walls 12, 14, a bedding adhesive 56, such as epoxy, the smaller ribs 52, the holes 53, and the corresponding blockout top surfaces 74. Depending upon the application, bedding adhesive 56 is typically applied between the bottom surface of flanges 48 and the blockout top surfaces 74.

In addition, the large ribs 50 may interact with an elastomeric material 62 applied over the top surface of the flanges 48 where the surface extends up to walls 12, 14 extend upwards, beyond the flanges 48 of the seal as shown. Such an elastomeric material 62 is typically applied in a semi-liquid form (e.g. thin-set mortor, concrete, plastic composite, etc.) In addition, fasteners (not shown) may extend through flanges 48 into the corresponding building structure to facilitate fastening the seal into the joint.

Figure 8A:
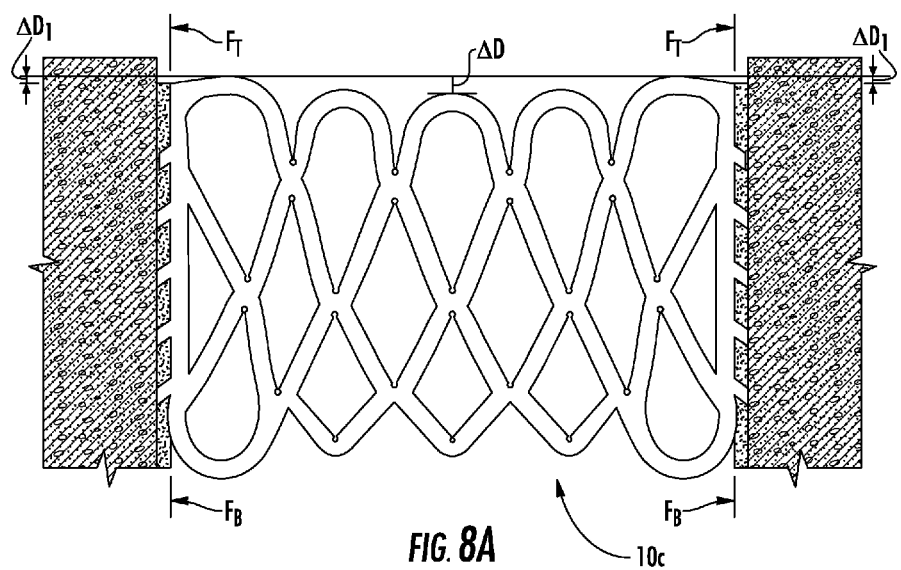
FIGS. 8A, 8B and 8C are end views of the embodiment of the seal shown in FIG. 7A illustrating the deflected state of the seal relative to the undeflected seal where the width of the seal is deflected to 85%, 65% and 55% of the undeflected width.
Figure 8B:
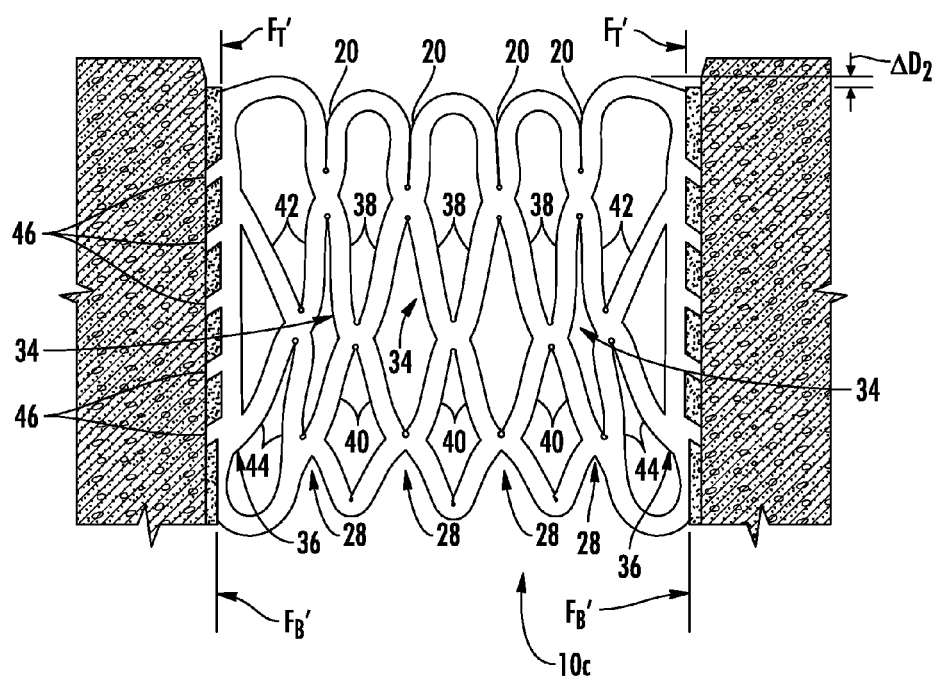
Figure 8C:
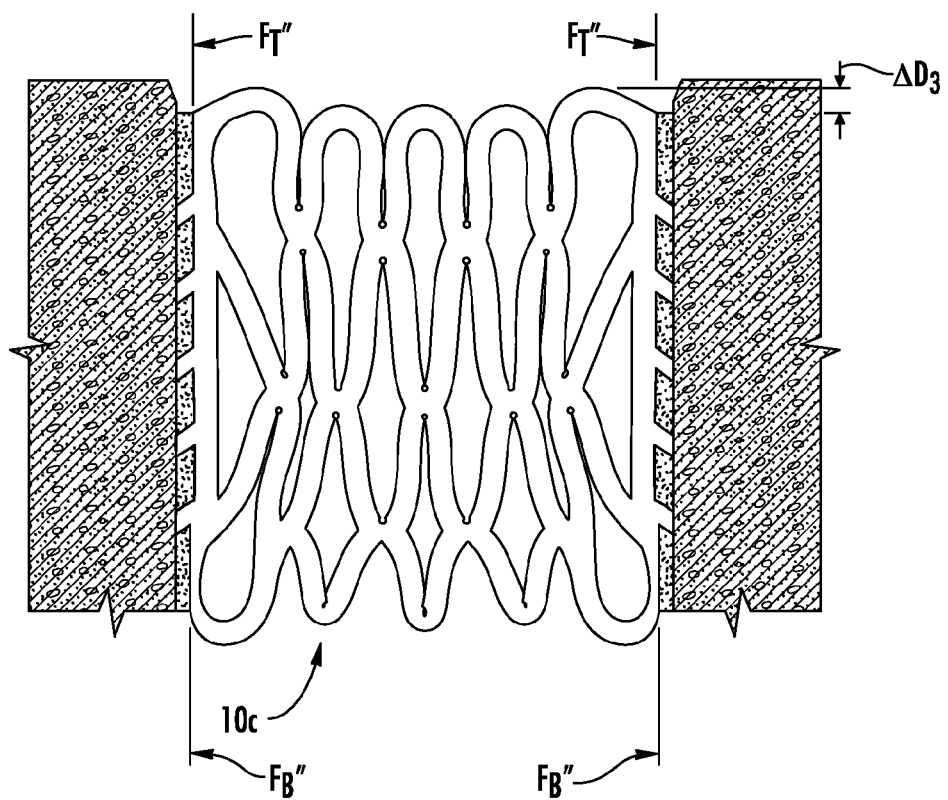

Referring now to FIGS. 8A-8C, embodiment 10c of the seal is shown, but the compression and loading functions provided by seal embodiments 10a, 10b and 10d are similar to 10c. In particular, the configurations of the top, side and bottom walls when combined with the dividers, produce a seal which, when compressed as shown in FIGS. 8A-8C, generates a force which resist compression at the top of the seals ($F_T$) and force which resist compression at the bottom of the seal ($F_B$). With the configurations of seals 10a, 10b, 10c and 10d, resistive forces $F_T$ and $F_B$, $F_T'$ and $F_B'$ and $F_T''$ and $F_B''$ will increase, but remain substantially equal to each other, as the seal is compressed. This is important when installing the seal into a building joint using an adhesive. In particular, prior to curing/setting of the adhesive, the adhesive will work as a lubricant between the seal and the joint. As a result, if the seal does not produce substantially equal resistive forces $F_T$ and $F_B$ when compressed, the difference in forces have a tendency to cause the seal to move or creep out of or further into the joint while the adhesive is curing.

By way of specific example, if the seals were configured such that force $F_B$ is larger than $F_T$ when the seal is compressed, the seal will tend to creep down into the joint while the adhesive is curing. Similarly, if the seal is configured such that force $F_T$ is larger than force $F_B$, the seal will tend to creep out of the joint while the adhesive is curing.

Another function provided by the configurations of seals 10a, 10b, 10c and 10d is that these configurations generate increasing load bearing for the top surfaces of the seals as the seals are compressed. Comparing the seal configurations of FIGS. 8A and 8C, the dividers move from the angled orientation in FIG. 8A to a more vertical orientation as shown in FIG. 8C. As the dividers become more vertical, they produce a beam structure along the longitudinal axis of the seals which provides a more rigid top wall. In particular, the more vertically oriented the dividers become, the more they function as the vertical flange in an I-beam configuration. Thus, the sections of the seal as shown in FIG. 8A transition from a Z-channel configuration to an I-beam configuration to rigidify the top wall of the seal. This is advantageous when the seal is used in a floor joint of a building to resist deflection when exposed to higher pressure loads such as those generated from a table leg, a narrow caster wheel on a cart, etc.

The configurations of seals 10a, 10b, 10c and 10d also operate to minimize the amount of upward deflection of the top wall of the seals when the seal is compressed within a building joint. This deflection is shown as $\Delta D_1$, $\Delta D_2$, and $\Delta D_3$ in FIGS. 8A-8C, respectively. As discussed above, FIGS. 8A-8C illustrate the seal in a deflected state relative to the undeflected seal where the width of the seal is deflected to 85%, 65% and 55% of the undeflected width. With the seal configurations disclosed herein, upward deflection of the side wall remains in the range of 5 mm when the seal is compressed to 55% of the undeflected seal width. This deflection occurs for typically used seal sizes at about room temperature for a thermoplastic vulcanizate elastomer such as that available under the trademark, Santoprene from Exxon Mobil.

As an example of a method for installing a seal of the type shown in FIGS. 1A, 2A, 6A and 7A, the installer may take the following steps:

Prior to installing seal 10a or 10c:

Step 1—Choose seal for installation.

Step 2—Measure the width and depth of the expansion joint 66 to be sure that they are 90° to the slab's surface.

Step 3—Measure along the length of the joint every foot to ensure the opening is the correct size for the seal.

Step 4—Clean the joint surface 68 of all contaminants and impurities, e.g., water repellants, laitance, surface dirt, etc.

Step 5—Lay a piece of seal the entire length of the expansion joint 66.

Prior to installation, the proper seal is chosen for installation (Step 1). Seals are designed to be in a minimum 15% compression at all times. Therefore, it is not advisable to choose a seal that is the same width as the expansion joint 66 in its nominal state. Measure the width and depth of the expansion joint 66 to be sure that they are 90° to the slab's surface (Step 2). Measure along the expansion joint 66, along the top joint edge 70 of the building joint 60 to ensure that the correct seal is installed (Step 3), any horizontal deviation greater than 1/16" should be corrected. Clean the joint surface 68 of contaminants and impurities (Step 4) by sandblasting or wire brushing. Lay the seal along the entire length of the expansion joint 66 (Step 5) and then install the seal in the expansion joint 66 without adhesive 54 to determine if the seal is being stretched during or after installation. Any excess amount of seal remaining at the end of the building joint 60 is due to stretching. The stretch percentage is calculated to determine the amount of stretch. The stretch percentage equals the amount of excess seal length divided by the original seal length. A stretch percentage that is greater than 3% is unacceptable and in some cases a stretch percentage of 1% or more is unacceptable. It is important to inspect stretching early in the installation process. Stretching the seal during installation is a major cause for a seal to prematurely fail.

Installing the seal 10a or 10c:

Step 1—Line the top joint edge 70 with tape, e.g., 2" wide tape.

Step 2—Apply adhesive 54 to both the joint surfaces 68 and walls 12, 14 of the seal.

Step 3—Compress seal and insert into expansion joint 66, starting from one end and working toward the opposite end.

Step 4—Clean the visible surface of the seal by removing any excess adhesive 54.

Step 5—Remove tape from the top joint edge 70 and remove any excess adhesive 54 from the building joint 60.

The top joint edge 70 is lined with 2" wide tape (Step 1). Adhesive 54 is then applied to the joint surfaces 68 and on the walls 12, 14 of the seal (Step 2). The adhesive 54 must contain an adequate solids percentage, be uniform, contain no lumps, have correct viscosity and have a drying time between eight and twenty minutes. The adhesive 54 should also contain an MSDS sheet for user safety. The adhesive 54 will begin thickening at 32° F. Therefore, when installing seals at temperatures below 32° F., the adhesive 54 should be stored in a heated warehouse until needed. Depending on multiple factors, e.g., joint size, temperature, experience, it may be best to mix ½ gallon of adhesive 54 at a time. Once the adhesive 54 is applied to the seal, the seal is compressed and inserted into the expansion joint 66, starting from one end of the seal to the opposite end (Step 3). To ensure that the seal is installed appropriately, the seal should be level to the top surface. The seal should also be installed at the proper depth. The proper depth is 1/16" to 3/16" below the top joint edge 70. If the seal is installed in a building joint 60 with a beveled edge, then the top surface of the seal should be installed 1/16" to 3/16" below the bottom of the beveled portion. If the seal is too deep, the joint may gather debris, e.g., rocks, nails, etc., which may cause damage to the seal and/or joint face. If the seal is too shallow, the seal may receive abrasive wear from tire contact or be pulled out. After the seal is installed, the visible surface is cleaned (Step 4). A tool may be used to remove any excess adhesive 54, i.e., a margin trowel. Remove the tape from the top joint edge 70 and remove any excess adhesive 54 from the building joint 60 (Step 5). The adhesive 54 should not cure before cleaning.

The seals may be installed by hand or with an installation machine. Extra care should be taken when installing seals by hand to ensure seals are not damaged, e.g., punctures or excess stretching caused by hand tools. Installation machines should be able to install seals at specified depths, with a maximum of 3% stretch and without cutting, nicking or twisting of the seal.

As an example of a method for installing a seal of the type shown in FIGS. 1B, 2B, 6B and 7B, the installer may take the following steps:

Prior to installing seal 10b or 10d:

Step 1—Choose seal for installation.

Step 2—Clean the blockout area 72, including the blockout top surface 74, of all contaminants and impurities, e.g., water repellants, laitance, surface dirt, etc.

Step 3—Level the blockout top surface 74 flat.

Step 4—Make blockout area 72 depth a minimum of ¾" and a minimum width of 2½".

Prior to installation, the proper seal is chosen for installation (Step 1). Clean the blockout area 72, including the blockout top surface 74, of all contaminants and impurities (Step 2) by sandblasting or wire brushing before applying the bedding adhesive 56. The blockout area 72 must be completely dry before applying the bedding adhesive 56. Level the blockout top surface 74 flat (Step 3). A latex modified mortar or equal may be used to provide a dead level bearing area for the seals. Make the depth of the blockout area 72 a minimum of ¾" and a minimum width of 2½" (Step 4).

Installing the seal 10b or 10d:

Step 1—Center the seal over the expansion joint 66 and install with the extension flanges 48 seated squarely on the blockout top surface 74.

Step 2—Prepare bedding adhesive 56.

Step 3—Raise the extension flanges 48 and spread bedding adhesive 56 mixture evenly over blockout top surface 74.

Step 4—Press extension flanges 48 firmly into the bedding adhesive 56.

Step 5—Mix elastomeric blockout material 62.

Step 6—Mask seal for protection.

Step 7—Pour or scrape the mixed elastomeric material 62 into the blockout area 72 and trowel in place with a bullnose or bricklayer trowel.

Center the seal over the expansion joint 66 and install with the extension flanges 48 seated squarely on the blockout top surface 74 (Step 1). Before preparing the bedding adhesive 56, the seal should be compressed and properly seated with the expansion joint 66 along the entire length of the expansion joint 66. Prepare the bedding adhesive 56, i.e., Polycrete bedding adhesive (Step 2). Mix a white epoxy adhesive and a black epoxy adhesive together until a homogenous mixture is accomplished. Mixing the bedding adhesive 56 is best accomplished with a ½" to ¾" drill counter clockwise with a paint style mixing blade or paddle. The mixture should be mixed for approximately 3 minutes until a solid grey paste is achieved. Raise extension flanges 48 and spread bedding adhesive 56 mixture evenly over the blockout top surface 74 (Step 3). Press extension flanges 48 firmly into the bedding adhesive 56 before the bedding adhesive 56 cures (Step 4). Weights may be applied to the seal to ensure the extension flanges 48 remain flat. Extension flanges 48 should not protrude in an upwards direction. Extension flanges 48 must rest on the blockout top surface 74.

Once the extension flanges 48 are oriented properly on the blockout top surface 74, the elastomeric material 62 may be mixed (Step 5). The elastomeric material 62 may include an elastomeric epoxy, elastomeric fast cure and a mixed aggregate. For example, an elastomeric material 62 may include 4 liters of elastomeric epoxy, 250 mL of elastomeric fast cure and 2½ gallons of mixed aggregate. The elastomeric epoxy and the elastomeric fast cure are blended together first. The elastomeric material 62 may be mixed with an mixing drill that is ¾" counter clockwise with a paint style mixing blade or similar. This blending process should take no longer than 4 minutes with the mixing drill. Once the materials are blended, they may be stored at room temperature. The mixed aggregate is then added slowly to the blended elastomeric epoxy/elastomeric fast cure mixture. If using the mixing drill with a paint style mixing blade, the mixing blade should be kept on the bottom of the pail for a minimum of 30-45 seconds that is holding the contents of the mixed aggregate. Slowly, begin adding the blended elastomeric epoxy/elastomeric fast cure mixture to the mixed aggregate.

Before pouring the elastomeric material 62 into the blockout area 72, mask the seal for protection (Step 6). Duct tape may be used for masking because the elastomeric material 62 will not adhere to duct tape. Once the seal is masked, pour or scrape the elastomeric material 62 into the blockout area 72 and trowel in place with a bullnose or bricklayer trowel (Step 7). To assist with the application of the elastomeric material 62 to the blockout area 72, dip the tools being used in toluene or xylene to minimize adhesion of the elastomeric material to the tools.

To assist with installing the type of seal shown in FIGS. 1B, 2B, 6B and 7B, a heavy duty jiffy mixer may be used. This mixer may be used for mixing liquids and prebatched aggregate. A jiffy mixer may also require a 4,000 watt generator for running the mixer. In addition to the mixer, some other equipment suggested to be used to install these seals are two 40 lbs. propane tanks, a Rosebud or weed-burner torch ends, drills, trowels and duct tape.

For the seal shown in FIGS. 1B, 2B, 6B and 7B, it is also suggested that a minimum of three individuals assist each other with the installation of the joint system. One individual may operate the mixer, heat the aggregate and prepare the blend of aggregate and resins. Another individual may bring the prebagged aggregate to the mixer, deliver the final mix to the blockout area and place the mix in the blockout. The last individual packs and trowels the final mix after placement in the blockout area.

In the exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An elastic seal useable in an expansion joint of a building, the seal comprising:
   a pair of substantially straight parallel side wall portions, wherein each side wall portion has an outside surface having a length extending at least 24 inches, with the outside surfaces of the side wall portions being separated by a first distance;
   a top wall extending between the side wall portions, the top wall having a cross-sectional shape with a first flat portion, a second flat portion, at least 2 rounded crests and at least 3 troughs, wherein the troughs each extend from respective crests to a respective bottom, and the first flat portion extends directly from one side wall portion to one trough, the second flat portion extends directly from the other side wall portion to another trough, and the flat portions are perpendicular to the respective side wall portions when the seal is not deflected;
   a bottom wall extending between the side wall portions and displaced a second distance from the top wall such that the parallel side wall portions of the seal form the sides of a rectangular boundary within which at least one of the top or bottom walls reside, the bottom wall having a cross-sectional shape with at least 2 crests and at least 3 troughs, wherein the troughs each extend from respective crests to a respective bottom;
   a first set of at least 2 webs located within the rectangular boundary, each web of the first set having a length parallel with the length of the outside surfaces of the side wall portions and each web of the first set extending from the side wall portions to the bottom of the troughs in the respective top or bottom walls, wherein an angle between the webs of the first set and the respective side wall portions is at least 30 degrees when the side wall portions are separated by the first distance, and the angle is reduced to less than 25 degrees, when the seal is compressed so that the first distance is reduced by 35%; and
   a second set of at least 2 webs located within the rectangular boundary, each web of the second set having a length parallel with the length of the outside surfaces of the side wall portions and each web of the second set extending from one of the troughs in the top wall to one of the troughs in the bottom wall with no other webs extending in-between, wherein an angle between the webs of the second set is at least 50 degrees when the side wall portions are separated by the first distance, and the angle is reduced to less than 30 degrees, when the seal is compressed so that the first distance is reduced by 35%.

2. The seal of claim 1, wherein the outside surfaces of each of the side wall portions supports a plurality of ribs each having a length substantially parallel with the length of the outside surfaces of the side wall portions.

3. The seal of claim 2, wherein the some of the plurality of ribs are discontinuous.

4. The seal of claim 2, wherein the seal further comprises:
   the first set of at least 2 webs including at least 2 additional webs located within the rectangular boundary, each additional web of the first set having a length parallel with the length of the outside surfaces of the side wall portions and each additional web of the first set extending from the side wall portions to the bottom of the troughs in the top or bottom walls, wherein an angle between the additional webs of the first set and the respective side wall portions is at least 30 degrees when the side wall portions are separated by the first distance, and the angle is reduced to less than 25 degrees, when the seal is compressed so that the first distance is reduced by 35%; and
   the second set of at least 2 webs including at least 2 additional webs located within the rectangular boundary, each additional web of the second set having a length parallel with the length of the outside surfaces of the side wall portions and each additional web of the second set extending from one of the troughs in the top wall to one of the troughs in the bottom wall, wherein an angle between the additional webs of the second set is at least 50 degrees when the side wall portions are separated by the first distance, and the angle is reduced to less than 30 degrees, when the seal is compressed so that the first distance is reduced by 35%; and the side wall portions are at least 1 inch wide and the top and bottom walls are at least 2 inches wide.

5. The seal of claim 4, wherein the seal is a thermoplastic resilient material.

6. The seal of claim 4, wherein at least 2 webs extend from the side wall portions at a first point to the top wall, wherein the first point is displaced a third distance from the bottom wall, wherein the third distance is less than 35% of the second distance.

7. The seal of claim 4, wherein at least 2 webs extend from the side wall portions at a second point to the bottom wall, wherein the second point is displaced a fourth distance from the top wall, wherein the fourth distance is less than 35% of the second distance.

8. The seal of claim 7, wherein one of the webs extending from the first point and one of the webs extending from the second point extend from the same side wall portion at angles such that the webs intersect with each other at an intersection point located between the top wall and the bottom wall and displaced from the side wall portion from which the webs are extending.

9. An elastic seal useable in an expansion joint of a building, the seal comprising:
 a pair of substantially straight parallel side wall portions, wherein each side wall portion has an outside surface having a length extending at least 24 inches, with the outside surfaces of the side wall portions being separated by a first distance;
 a top wall extending between the side wall portions, the top wall including a first top wall portion perpendicular to and extending from one of the side wall portions when the seal is not deflected and a second top wall portion perpendicular to and extending from the other side wall portion when the seal is not deflected;
 a bottom wall extending between the side wall portions and displaced a second distance from the top wall such that the parallel side wall portions of the seal form the sides of a rectangular boundary within which at least one of the top or bottom walls reside, wherein the side wall portions have a midpoint that is located at half of the second distance;
 a first web divider located within the rectangular boundary, the first web divider having a length parallel with the length of the outside surfaces of the side wall portions and extending from a first point on one of the side wall portions to the top wall, wherein the first point is displaced a third distance from the bottom wall, wherein the third distance is less than 35% of the second distance;
 a second web divider located within the rectangular boundary, the second web divider having a length parallel with the length of the outside surfaces of the side wall portions and extending from a second point on one of the side wall portions to the bottom wall, wherein the second point is displaced a fourth distance from the top wall, wherein the fourth distance is less than 35% of the second distance, wherein the first web divider and the second web divider extend from the same side wall portion at angles such that the first web divider intersects with the second web divider in between the top wall and the bottom wall at an intersection point displaced from the side wall portion, wherein the angle between the web dividers and the respective side wall portions is at least 30 degrees when the side wall portions are separated by the first distance, and the angle is reduced to less than 25 degrees, when the seal is compressed so that the first distance is reduced by 35%; and at least 2 webs located within the rectangular boundary, each web having a length parallel with the length of the outside surfaces of the side wall portions and each web extending from the top wall to the bottom wall with no other webs extending in-between, wherein an angle between the webs is at least 50 degrees when the side wall portions are separated by the first distance, and the angle is reduced to less than 30 degrees, when the seal is compressed so that the first distance is reduced by 35%.

10. The seal of claim 9, wherein the outside surfaces of each of the side wall portions supports a plurality of ribs each having a length substantially parallel with the length of the outside surfaces of the side wall portions.

11. The seal of claim 10, wherein the top wall has a cross-sectional shape having the first top wall portion, the second top wall portion, at least 2 crests and at least 3 troughs, wherein the first top wall portion and the second top wall portion extending directly from the side wall portions are flat.

12. The seal of claim 11, wherein the bottom wall has a cross-sectional shape having at least 2 crests and at least 3 troughs.

13. The seal of claim 12, wherein the seal is a thermoplastic resilient material.

14. The seal of claim 13, wherein the seal further comprises:
 a third web divider located within the rectangular boundary, the third web divider having a length parallel with the length of the outside surfaces of the side wall portions and extending from a third point on one of the side wall portions to the top walls, wherein the third point is displaced the third distance from the bottom wall, wherein the third distance is less than 35% of the second distance;
 a fourth web sup divider port located within the rectangular boundary, the fourth web divider having a length parallel with the length of the outside surfaces of the side wall portions and extending from a fourth point on one of the side wall portions to the bottom wall, wherein the fourth point is displaced the fourth distance from the top wall, wherein the fourth distance is less than 35% of the second distance, wherein the third web divider and the fourth web divider extend from the same side wall portion at angles such that the third web divider intersects with the fourth web divider in between the top wall and the bottom wall at an intersection point displaced from the side wall portion, wherein the angle between the web dividers and the respective side wall portions is at least 30 degrees when the side wall portions are separated by the first distance, and the angle is reduced to less than 25 degrees, when the seal is compressed so that the first distance is reduced by 35%; and
 at least 2 additional webs located within the rectangular boundary, each additional web having a length parallel with the length of the outside surfaces of the side wall portions and each additional web extending from the top wall to the bottom wall wherein an angle between webs is at least 50 degrees when the side wall portions are separated by the first distance, and the angle is reduced to less than 30 degrees, when the seal is compressed so that the first distance is reduced by 35%, and the side wall portions are at least 1 inch wide and the top and bottom walls are at least 2 inches wide.

15. The seal of claim 14, wherein the first and second web dividers extend from one of the side wall portions and the third and fourth web dividers extend from the other side wall portion.

16. The seal of claim 10, wherein some of the plurality of ribs are discontinuous.

17. An elastic seal useable in an expansion joint of a building, the seal comprising:
   a pair of substantially straight parallel side wall portions, wherein each side wall portion has an outside surface having a length extending at least 24 inches, with the outside surfaces of the side wall portions being separated by a first distance;
   a top wall extending between the side wall portions, wherein the top wall includes a first flat portion and a second flat portion, wherein the flat portions are perpendicular to the respective side wall portions when the seal is not deflected;
   a bottom wall extending between the side wall portions and displaced a second distance from the top wall such that the parallel side wall portions of the seal form the sides of a rectangular boundary within which at least one of the top or bottom walls reside;
   a plurality of first web dividers located within the rectangular boundary, the first web dividers having a length parallel with the length of the outside surfaces of the side wall portions and extending from a first point on one of the side wall portions to the top wall, wherein the first point is displaced a third distance from the bottom wall, wherein the third distance is less than 35% of the second distance;
   a plurality of second web dividers located within the rectangular boundary, the second web dividers having a length parallel with the length of the outside surfaces of the side wall portions and extending from a second point on one of the side wall portions to the bottom wall, wherein the second point is displaced a fourth distance from the top wall, wherein the fourth distance is less than 35% of the second distance, wherein one of the first web dividers and one of the second web dividers extend from the same side wall portion at angles such that the first web divider intersects with the second web divider in between the top wall and the bottom wall at a single intersection point displaced from the side wall portion; and
   a plurality of webs located within the rectangular boundary, each web having a length parallel with the length of the outside surfaces of the side wall portions, each web extending from the top wall to the bottom wall with no other webs extending in-between, wherein the top wall is compressed a predetermined distance between the side wall portions by a force that is substantially the same force required to compress the bottom wall between the side walls substantially the predetermined distance.

18. The seal of claim 17, wherein the outside surfaces of each of the side wall portions supports a plurality of ribs each having a length substantially parallel with the length of the outside surfaces of the side wall portions.

19. The seal of claim 18, wherein the top wall has a cross-sectional shape having at least 2 crests and at least 3 troughs, wherein the first flat portion extends between one side wall portion and trough and the second flat portion extends between the other side wall portion and another trough.

20. The seal of claim 19, wherein the bottom wall has a cross-sectional shape having at least 2 crests and at least 3 troughs.

21. The seal of claim 20, wherein the seal is a thermoplastic resilient material and the side wall portions are at least 1 inch wide and the top and bottom walls are at least 2 inches wide.

22. The seal of claim 18, wherein some of the plurality of ribs are discontinuous.

* * * * *